United States Patent [19]

Mizote

[11] 4,254,744
[45] Mar. 10, 1981

[54] METHOD AND APPARATUS FOR MEASURING AIR QUANTITY IN RELATION TO ENGINE SPEED

[75] Inventor: Masanori Mizote, Yokosuka, Japan

[73] Assignee: Nissan Motor Company, Limited, Yokohama, Japan

[21] Appl. No.: 916,502

[22] Filed: Jun. 19, 1978

[30] Foreign Application Priority Data

Jun. 30, 1977 [JP] Japan .................................. 52-78264

[51] Int. Cl.³ ............................................. F02D 5/00
[52] U.S. Cl. ................................. 123/480; 123/483; 123/487; 73/117.3
[58] Field of Search .......... 123/32 EB, 32 EC, 32 EJ, 123/32 EA, 117 D; 364/431; 73/117.3

[56] References Cited

U.S. PATENT DOCUMENTS

| | | | |
|---|---|---|---|
| 3,927,304 | 12/1975 | Wentworth et al. | 123/32 EE |
| 3,941,103 | 3/1976 | Hartig | 123/117 D |
| 3,991,727 | 11/1976 | Kawai et al. | 123/32 EB |
| 4,058,089 | 11/1977 | Schmidt et al. | 123/32 EB |
| 4,073,270 | 2/1978 | Endo | 123/32 EB |
| 4,107,717 | 8/1978 | Klötzner et al. | 123/32 EA |
| 4,121,553 | 10/1978 | Hasegawa | 123/117 D |
| 4,127,092 | 11/1978 | Fresow et al. | 123/117 D |

FOREIGN PATENT DOCUMENTS 1437748 6/1976 United Kingdom ................ 123/32 EC Primary Examiner—Charles J. Myhre
Assistant Examiner—Andrew M. Dolinar

[57] ABSTRACT

First electrical pulses are generated in response to the quantity of air inducted per unit time and second electrical pulses are generated in response to the speed of revolution of an engine crankshaft. A counter is provided which counts the number of second electrical pulses for an interval between successive ones of the first electrical pulses. The counted number of second electrical pulses is fed into a computer where the signal is processed to derive a signal representative of the reciprocal of the counted number.

1 Claim, 2 Drawing Figures

METHOD AND APPARATUS FOR MEASURING AIR QUANTITY IN RELATION TO ENGINE SPEED

BACKGROUND OF THE INVENTION

The present invention relates to method and apparatus for measuring the quantity of air inducted in relation to the speed of an internal combustion engine.

Accurate measurement of air quantity inducted to engine cylinders in relation to the speed of the engine is essential to the control of a mixture of air and fuel at a desired ratio for purposes of reducing the amount of noxious emissions. A variety of fluid sensors of the type in which the frequency of oscillatory movement of a working member is used to represent the fluid flow, have been employed for such purposes in preference to the sensors of the analog type in which the fluid flow is represented in analog value, because of their advantages in manufacturing tolerances and sensor aging over the latter. Since the air quantity varies with engine operations, the digital representation of the fluid sensor would vary typically as 40 times as many as its minimum digital value for a corresponding range of engine operations from idle to full throttle operations. This necessitates the use of a counter having a maximum capacity of more than 11 bits, thereby adding the complexity to the counter with an increased cost.

SUMMARY OF THE INVENTION

The primary object of the present invention is to provide air flow measurement which permits reduction of the number of pulses to be counted by a counter without impairing the degree of measurement precision.

Another object is to permit air flow measurement with the degree of precision being kept constant for all engine operating conditions.

These objects are achieved by the provision of a pulse generator which generates pulses in relation to the speed of revolution of an engine crankshaft and by counting the generated pulses during an interval between successive oscillations of the fluid sensor. The number of counted pulses is a digital representation which is proportional to the engine speed, but inversely proportional to the air quantity inducted to the engine per unit time. A microcomputer is provided to compute the reciprocal of the digital value to measure the air quantity inducted for each cylinder cycle. Although other means may be effective to compute the reciprocal, the use of a microcomputer is advantageous because of its flexibility to process various electrical signals for the purpose of determining fuel injection time or for other purposes.

BRIEF DESCRIPTION OF THE DRAWINGS

The invention will be further described in connection with the accompanying drawings, in which.

DETAILED DESCRIPTION

Figure 1:
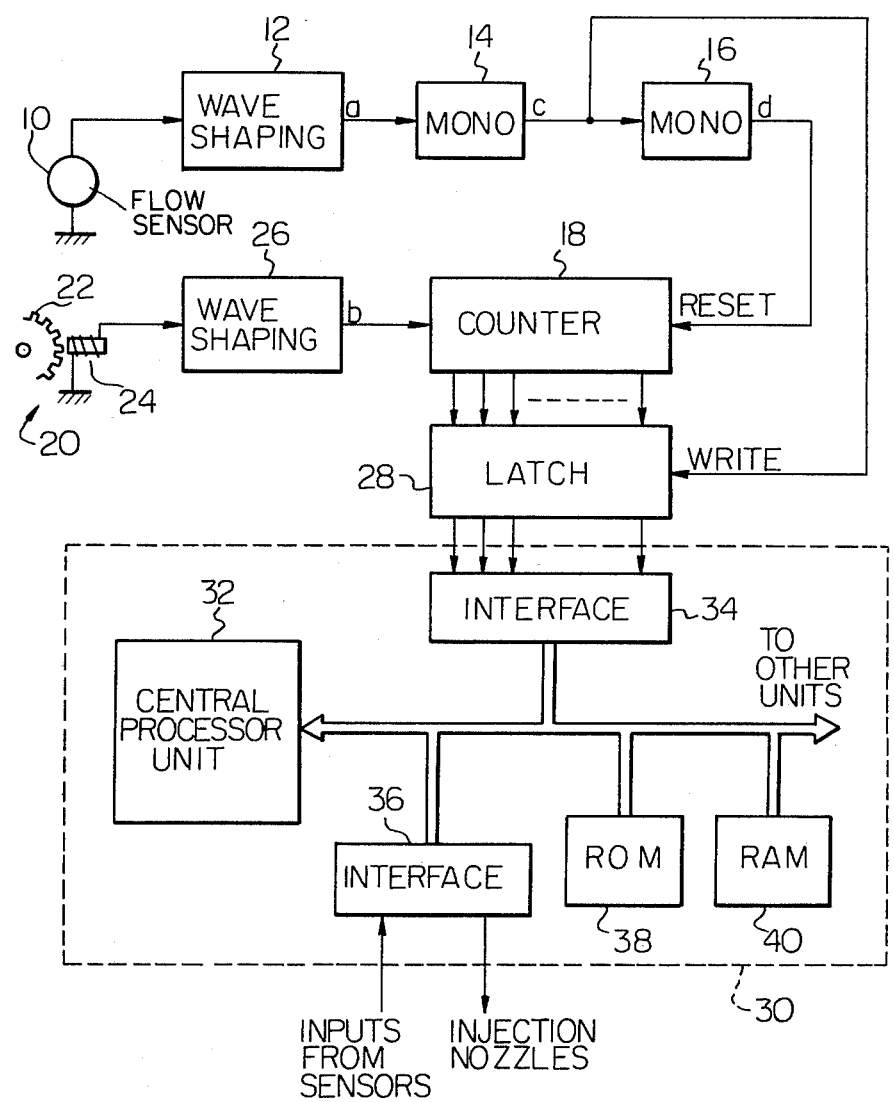
FIG. 1 is a block diagram of a preferred embodiment of the invention.

In FIG. 1, a fluid sensing device 10 is provided to generate a train of electrical pulses the frequency of which is variable as a function of the quantity of air inducted per unit time through an air intake passage of an internal combustion engine (not shown). The sensing device 10 may be of the type as disclosed in copending U.S. Pat. application Ser. No. 703,292 filed July 7, 1976 and assigned to the same assignee as the present invention. The output from the fluid sensing device 10 is applied to a waveshaping circuit 12 where the input signal is reshaped into a rectangular waveform which is then applied to a monostable multivibrator 14 of a trailing edge triggered type. The output from the monostable 14 is cascaded through a second monostable multivibrator 16 to a reset terminal of a binary counter 18.

An engine speed detector 20 is provided having a magnetically polarized toothed disc 22 mounted on a crankshaft of the engine for rotation therewith and a sensing coil 24 fixedly mounted relative to the periphery of the disc 22 for sensing the variation of magnetic flux to generate a corresponding electrical pulse, this pulse being applied to a second waveshaping circuit 26 and thence to an input terminal of the binary counter 18.

The binary counter 18 has a plurality of output leads which are connected to a latching circuit 28 for latching the instantaneous binary count value of the counter 18 in response to the output of monostable 14.

Figure 2:
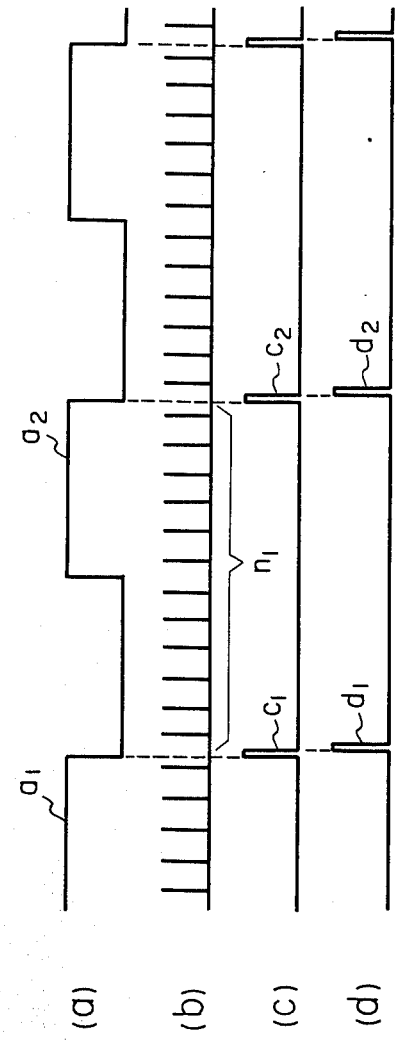
FIG. 2 is a timing diagram associated with the embodiment of FIG. 1.

The output frequency of the fluid sensor 10 is approximately 40 Hz under idled engine condition and approximately 1600 Hz at full engine power so that for all engine operating conditions the frequency of the latter is higher than the frequency of the former. The operation of the circuit of FIG. 1 will be understood from the timing diagram shown in FIGS. 2a–2d. FIG. 2a represents the waveform of the waveshaper 12 and FIG. 2b the pulses from the waveshaper 26. Monostable 14 generates pulses $c_1$ and $c_2$ (FIG. 2c) in response to the trailing edges of square wave pulses $a_1$ and $a_2$, respectively, of the waveshaper 12, and monostable 16 produces its output pulses $d_1$ and $d_2$ in response to the trailing edges of the pulses $c_1$ and $c_2$, respectively (FIG. 2d). It is seen that for each pulse repetition period or cycle of the fluid sensor 10 output there is a plurality of pulses from the engine speed sensor 20.

The binary counter 18 is reset in response to the reset pulse $d_1$ to start counting the pulses of FIG. 2b, and upon the count of $n_1$ pulses, the latching circuit 28 is enabled in response to the pulse $c_2$ to clear the contents stored in response to the previous pulse $c_1$ in order to read out the instantaneous binary count value of counter 18, $n_1$ in this case which is latched therein until the occurrence of a next enable pulse from the monostable 14. Immediately after the latching of the binary information, the binary counter 18 is cleared in response to the reset pulse $d_2$. Since the latching occurs in response to each trailing edge of the fluid sensor 10 output, the binary number stored in the latching circuit 28 is proportional to the instantaneous engine speed and inversely proportional to the instantaneous quantity of air inducted per unit time. It is thus understood that the quantity of air inducted for each crankshaft revolution can be determined by computing the reciprocal of the decimal representation of the latched binary count. This computation is achieved by a microcomputer indicated by the block 30 which includes a central processor unit 32 to which the information now stored in latch 28 is transferred through an interfacing device 34. The central processor 32 also receives other information from engine operating sensors (not shown) through an interface 36. The computer 30 is provided with a read-only memory 38 and a random access memory 40. The program stored in the read-only memory 38 instructs the central processor 32 to read the information in the latching circuit 28 and execute the necessary arithmetic operation to compute the reciprocal of a decimal number representation of the latched count in accordance with a stored program of the read-only memory. The random access memory 40 is used for temporary storage of the information during the process of computation. The computed result, that is, the instantaneous quantity of air is corrected in the processor 32 in accordance with inputs from the engine operating sensors such as engine coolant temperature to determine the width of an injection pulse which is applied through the interface 36 to fuel injectors (not shown).

The circuit arrangement of the present invention would result in a smaller range of binary counts. This is explained as follows: at an engine revolution of 600 rpm, the binary counter 18 is required to accept 180 input pulses for closed throttle operation (40 Hz output from fluid sensor) and 45 input pulses for wide open throttle operation (160 Hz output from fluid sensor), and at an engine revolution of 6000 rpm, the same range of binary counts is sufficient for a range of operations from closed (400 Hz output from fluid sensor) to wide open throttle operations (1600 Hz output from fluid sensor). Therefore, the maximum capacity of the binary counter 18 is 8 bits.

Since the digital output from the latching circuit 28 occurs in response to each pulse from the fluid sensor 10, the air-flow measurement interval is inversely proportional to the air speed so that the degree of measurement precision can be kept constant for all engine operations.

What is claimed is:

1. Apparatus for measuring the quantity of air supplied to an internal combustion engine in relation to the speed of rotation of said engine, said engine being adapted to operate under varying load conditions which result in a greater range of variations in the quantity of said supplied air than the range of variations of said engine speed, comprising:

means for generating first electrical pulses, the repetition of frequency of which is proportionally related to the rate of air supplied to said engine;

means for generating second electrical pulses, the repetition frequency of which is proportionally related to the speed of rotation of said engine and higher than the frequency of said first electrical pulses;

counting means for counting the number of said second electrical pulses in response to each of said first pulses;

computing means for computing the reciprocal of said counted number of said second electrical pulses to measure said quantity of air supplied to said engine in relation to said engine rotation speed;

a first monostable device for generating an output signal in response to said first electrical pulses;

a second monostable device connected to the output of said first monostable device to generate an output signal in response to an edge of the output signal from said first monostable device; and a latching circuit responsive to the output signal of said first monostable device for storing the contents of said counting means until the subsequent occurrence of an output signal from said first monostable device;

and wherein said counting means is responsive to each of the output signals from said second monostable device to start counting said second electrical pulses.

* * * * *